US012684210B2

(12) United States Patent
Takaki et al.

(10) Patent No.: US 12,684,210 B2
(45) Date of Patent: Jul. 14, 2026

(54) ELECTRONIC APPARATUS ESTIMATING AMBIENT TEMPERATURE AND CONTROL METHOD THEREOF

(71) Applicant: CANON KABUSHIKI KAISHA, Tokyo (JP)

(72) Inventors: Yasuhito Takaki, Kanagawa (JP); Jun Kamiya, Kanagawa (JP); Hiroshi Toriumi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 290 days.

(21) Appl. No.: 18/539,587

(22) Filed: Dec. 14, 2023

(65) Prior Publication Data

US 2024/0205527 A1      Jun. 20, 2024

(30) Foreign Application Priority Data

Dec. 20, 2022      (JP) .................................. 2022-203530

(51) Int. Cl.
| | |
|---|---|
| *H04N 23/52* | (2023.01) |
| *G01K 1/20* | (2006.01) |
| *G01K 3/10* | (2006.01) |
| *H04N 23/51* | (2023.01) |
| *H04N 23/60* | (2023.01) |

(52) U.S. Cl.
CPC .............. *H04N 23/52* (2023.01); *G01K 1/20* (2013.01); *G01K 3/10* (2013.01); *H04N 23/51* (2023.01); *H04N 23/60* (2023.01)

(58) Field of Classification Search
CPC .. G01K 1/20; G01K 3/10; G01K 7/25; G01K 7/42; G01K 7/427; H04N 23/52; H04N 23/51; H04N 23/60
See application file for complete search history.

(56) References Cited

U.S. PATENT DOCUMENTS

| | | | | |
|---|---|---|---|---|
| 2018/0136051 A1* | 5/2018 | Ishii | ......................... | G01K 1/20 |
| 2022/0136909 A1* | 5/2022 | Kim | ...................... | G06F 1/206 |
| | | | | 702/136 |

FOREIGN PATENT DOCUMENTS

| | | | | |
|---|---|---|---|---|
| CN | 113670478 A | * 11/2021 | ........... | G01K 15/005 |
| JP | 2015-069048 A | 4/2015 | | |
| JP | 2018-081467 A | 5/2018 | | |
| JP | 2021-015076 A | 2/2021 | | |

OTHER PUBLICATIONS

Computer translation of CN_113670478_A (Year: 2025).*
Computer translation of JP_2015069048_A (Year: 2025).*

* cited by examiner

*Primary Examiner* — Randy W Gibson

(74) *Attorney, Agent, or Firm* — Cowan, Liebowitz & Latman, P.C.

(57) ABSTRACT

An electronic apparatus comprises a first thermometer and a second thermometer arranged such that a change over time of a difference between a first measurement obtained by the first thermometer and a second measurement obtained by the second thermometer satisfies a specific condition. The electronic apparatus executes control for restricting a function of the electronic apparatus in response to a temperature of a housing of the electronic apparatus exceeding a threshold. The electronic apparatus estimates an ambient temperature based on the first measurement, the second measurement, and the specific condition and sets the threshold based on the estimated ambient temperature.

14 Claims, 6 Drawing Sheets

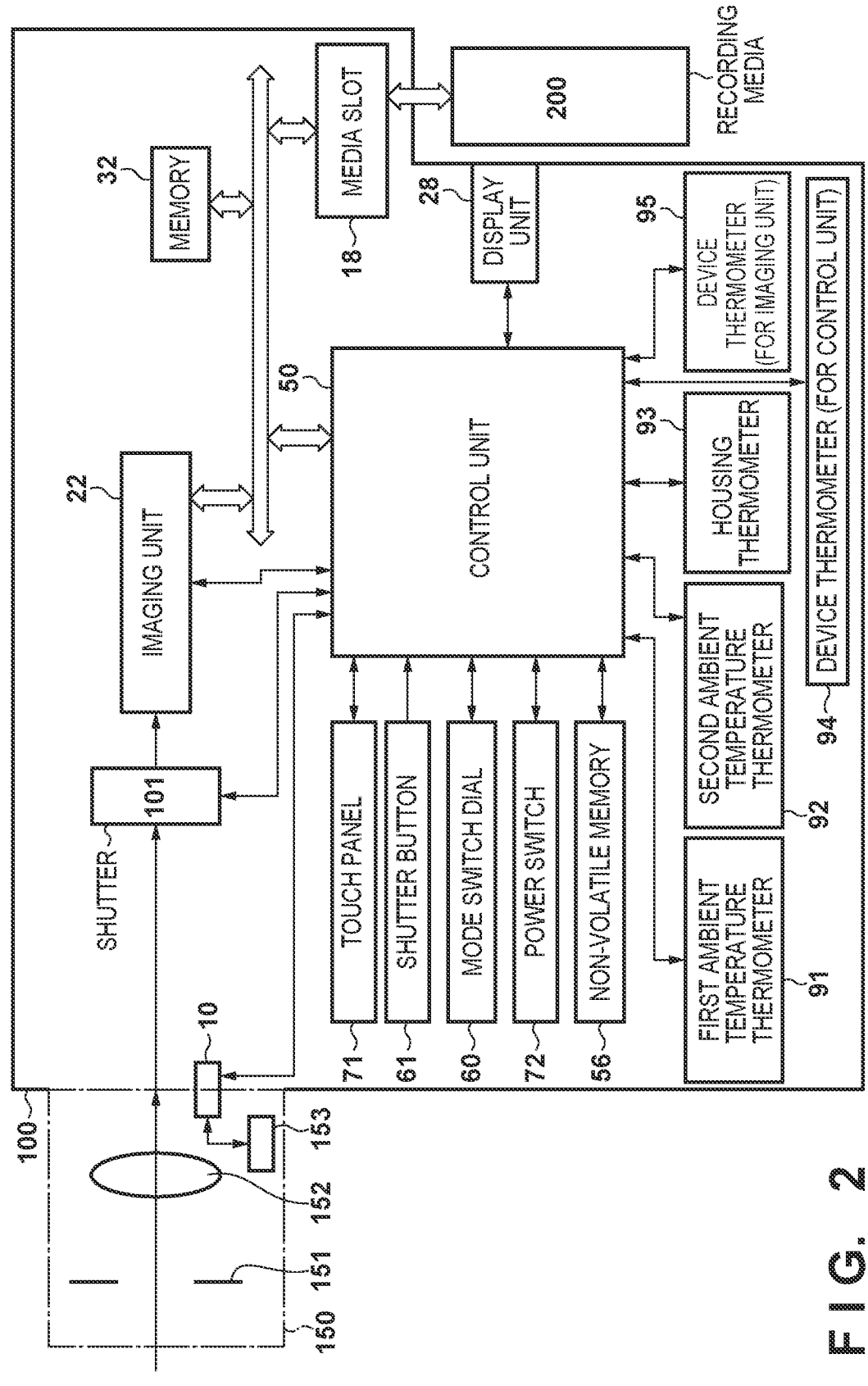
F I G. 2

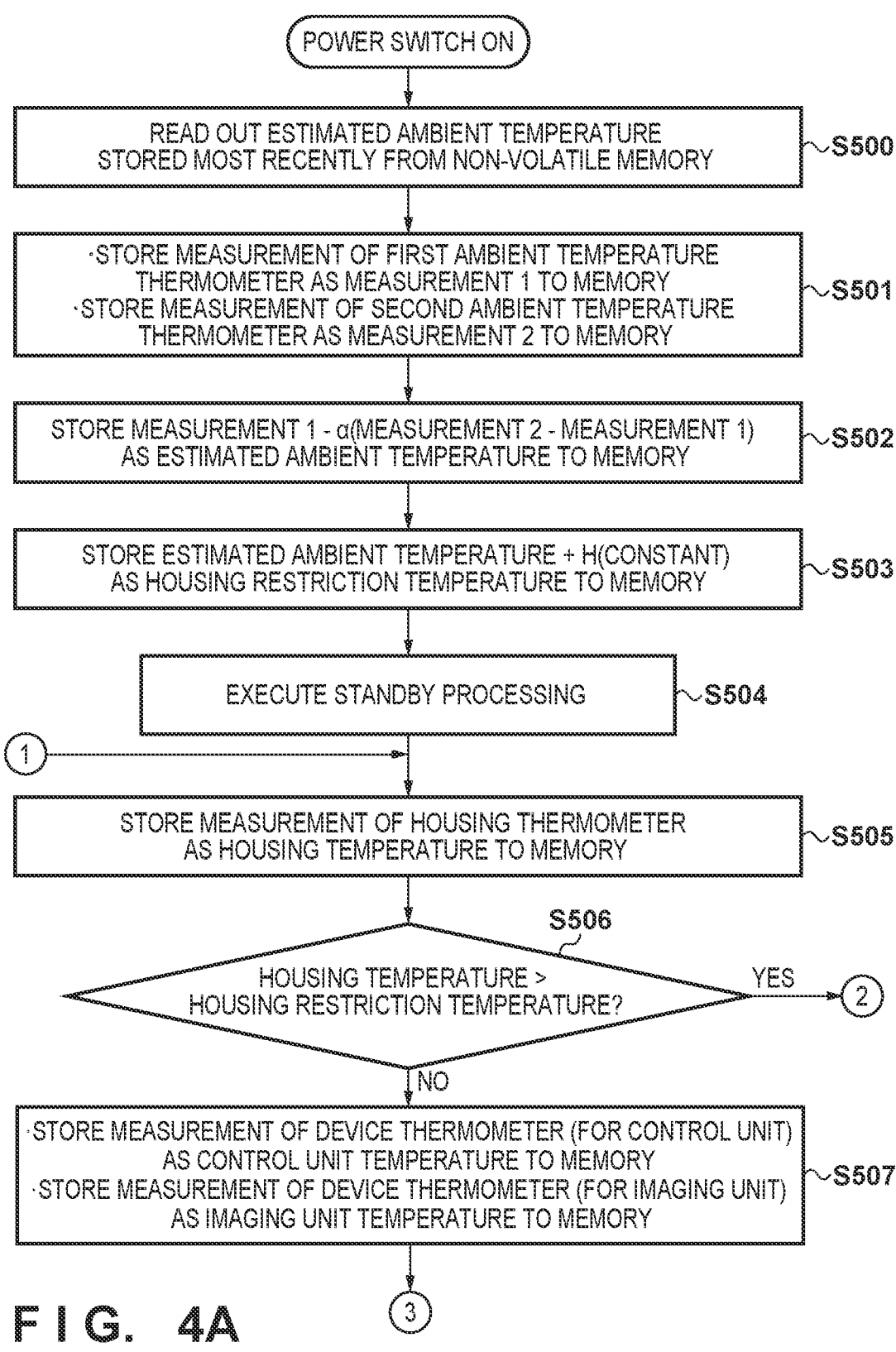
F I G.  4A

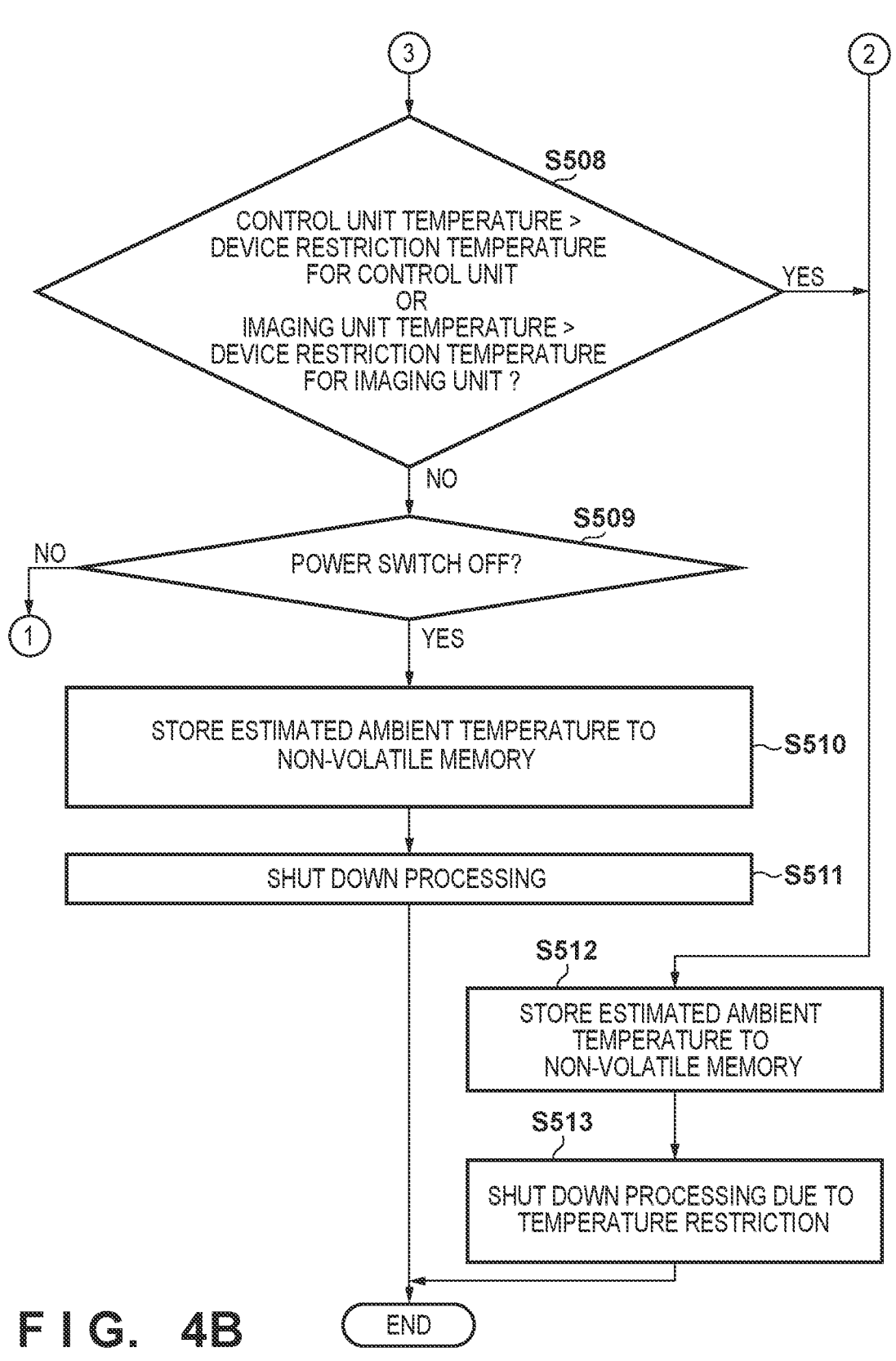
F I G. 4B

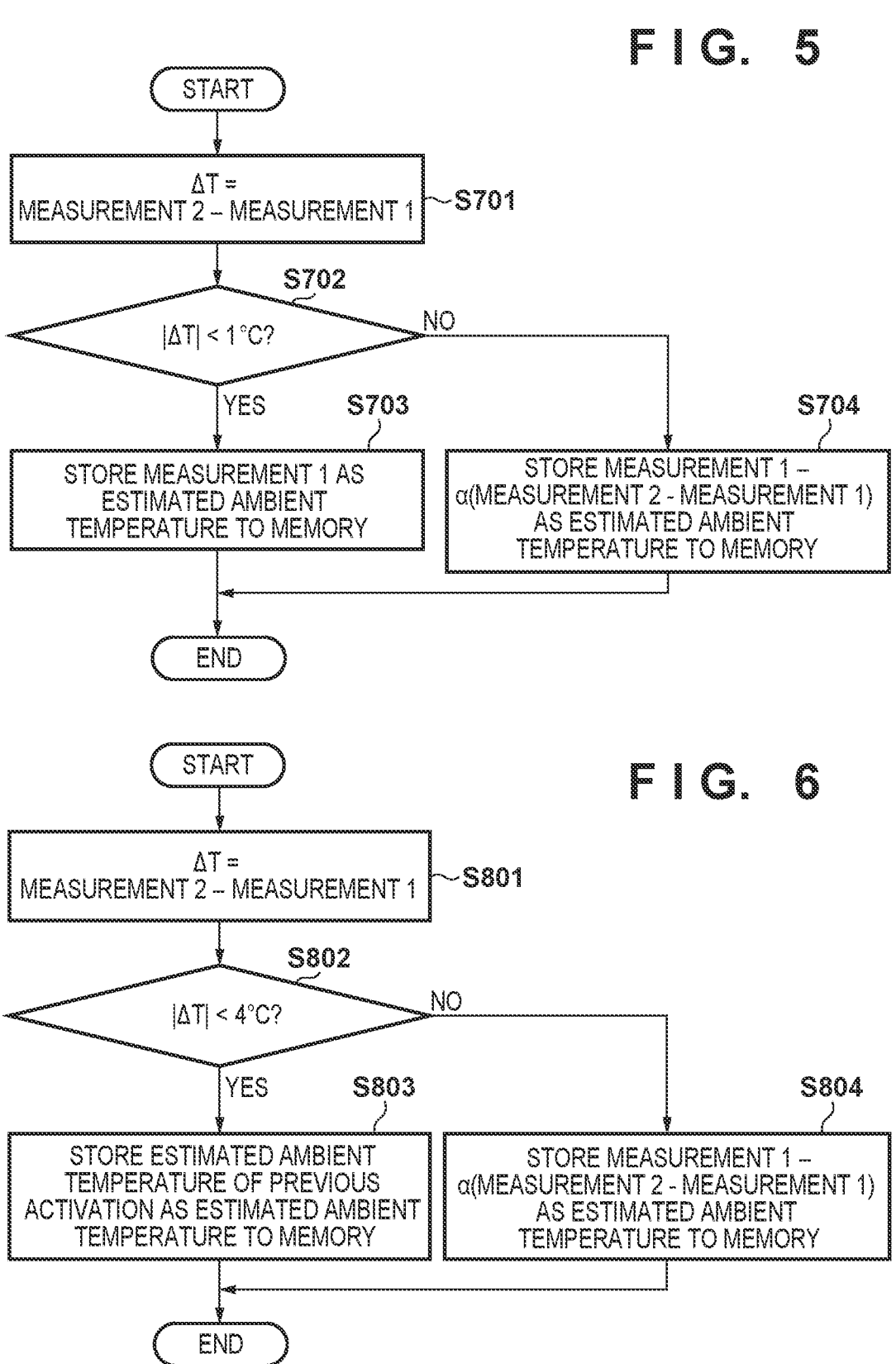
F I G. 5
F I G. 6

ELECTRONIC APPARATUS ESTIMATING AMBIENT TEMPERATURE AND CONTROL METHOD THEREOF

BACKGROUND OF THE INVENTION

Field of the Invention

The present invention relates to an electronic apparatus and a method of controlling the same.

Description of the Related Art

In small electronic apparatuses such as digital cameras and smartphones, the packaging density of the components is high and there is little space in the casing, causing the temperature of the apparatus to easily increase. Excessive temperature increase may cause damage to the components, the forcible end of operations, and the like. Also, in regard to the safety of electronic apparatuses, standards have been proposed for restricting the operation of an electronic apparatus when the housing temperature of the electronic apparatus exceeds a predetermined temperature. At this time, the predetermined temperature is controlled according to the ambient temperature.

The measurement of a thermometer provided in the electronic apparatus is influenced by the casing temperature. Regarding this, in Japanese Patent Laid-Open No. 2018-81467, the ambient temperature is estimated using the temperature measured at or near the heat source component, a reference temperature value measured at a position separated from the component, and a plurality of transfer functions.

In Japanese Patent Laid-Open No. 2018-81467, a component-reference temperature sensor transfer function, a component-component temperature sensor transfer function, and a component-casing surface transfer function need to be obtained in advance for each component, making preparation complicated. The operation processing required for estimation is also complex.

SUMMARY OF THE INVENTION

In consideration of the aforementioned problems with known techniques, an aspect of the present invention provides an electronic apparatus with a simple configuration that can accurately estimate the ambient temperature and a method of controlling the same.

According to an aspect of the present invention, there is provided an electronic apparatus comprising: a first thermometer; a second thermometer, wherein the first thermometer and the second thermometer are arranged such that a change over time of a difference between a first measurement obtained by the first thermometer and a second measurement obtained by the second thermometer satisfies a specific condition; a CPU; a memory that stores a program for, when the program is executed by the CPU, causing the electronic apparatus to function as: a control unit that executes control for restricting a function of the electronic apparatus in response to a temperature of a housing of the electronic apparatus exceeding a threshold, wherein the control unit estimates an ambient temperature based on the first measurement, the second measurement, and the specific condition and sets the threshold based on the estimated ambient temperature.

According to another aspect of the present invention, there is provided an electronic apparatus comprising: an image sensor; a first thermometer; a second thermometer; a third thermometer for the image sensor; a CPU; a fourth thermometer for the CPU; a fifth thermometer for a housing of the electronic apparatus; and a memory that stores a program for, when the program is executed by the CPU, causing the electronic apparatus to function as: a control unit that executes control for restricting a function of the electronic apparatus on a basis of a first measurement obtained by the first thermometer, a second measurement obtained by the second thermometer, a third measurement obtained by the third thermometer, a fourth measurement obtained by the fourth thermometer, and a fifth measurement obtained by the fifth thermometer.

According to a further aspect of the present invention, there is provided a method of controlling an electronic apparatus, wherein the electronic apparatus comprises: a first thermometer; and a second thermometer; wherein the first thermometer and the second thermometer are arranged such that a change over time of a difference between a first measurement obtained by the first thermometer and a second measurement obtained by the second thermometer satisfies a specific condition; the method comprising: executing control for restricting a function of the electronic apparatus in response to a temperature of a housing of the electronic apparatus exceeding a threshold, wherein the executing control includes estimating an ambient temperature based on the first measurement, the second measurement, and the specific condition, and setting the threshold based on the estimated ambient temperature.

Further features of the present invention will become apparent from the following description of exemplary embodiments (with reference to the attached drawings).

BRIEF DESCRIPTION OF THE DRAWINGS

FIG. 2 is a block diagram illustrating a functional configuration example of a digital camera according to an embodiment.

FIGS. 4A and 4B are flowcharts relating to the operations according to a first embodiment.

FIG. 5 is a flowchart relating to the operations according to a second embodiment.

FIG. 6 is a flowchart relating to the operations according to a third embodiment.

DESCRIPTION OF THE EMBODIMENTS

Figure 1A:
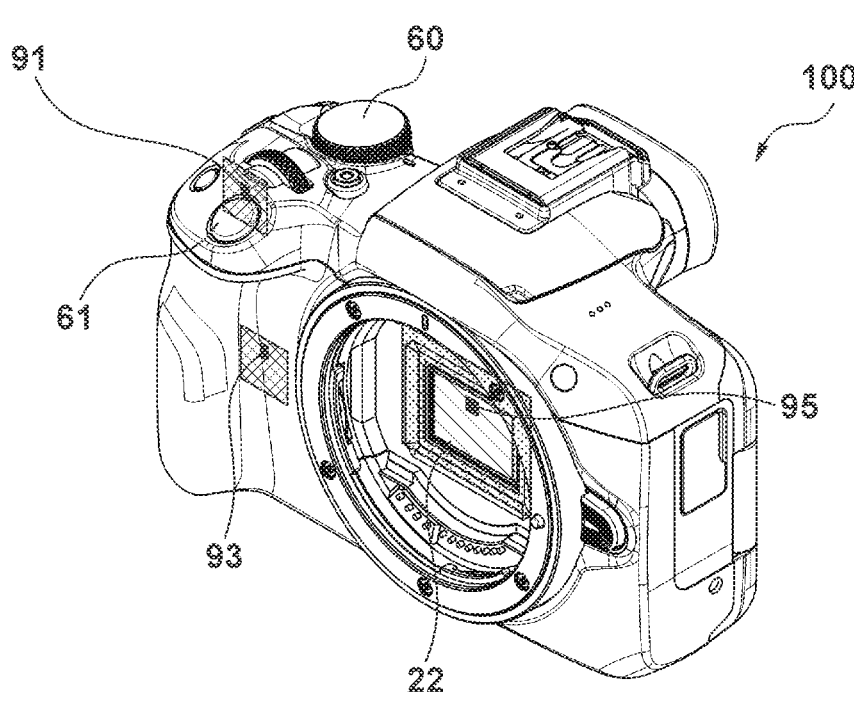
FIGS. 1A and 1B are perspective views of a digital camera representing an example of an electronic apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the embodiments described below, the present invention is embodied as an interchangeable-lens digital camera. However, the present invention can be implemented with any electronic apparatus. Examples of such an electronic apparatus include video cameras, computer devices (personal computers, tablet computers, media players, PDAs, and the like), mobile phones, smartphones, game consoles, robots, drones, and drive recorders. These are examples, and the present invention can be implemented with other electronic apparatuses.

First Embodiment

Figure 1B:
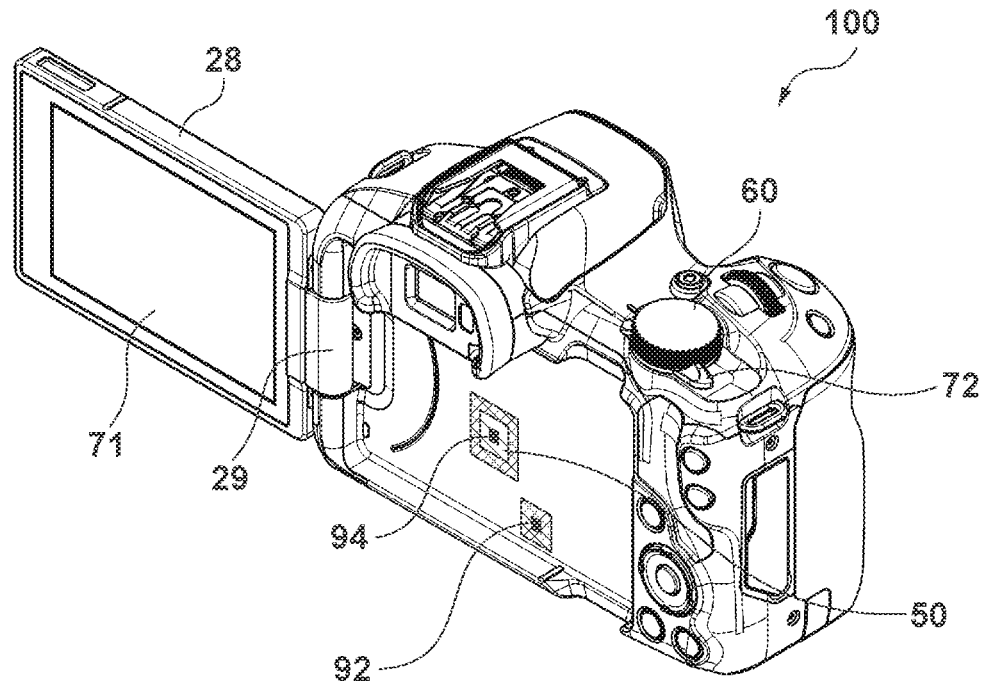

FIGS. 1A and 1B are perspective views illustrating an example of an electronic apparatus according to an embodiment of the present invention and illustrating an external appearance example of an interchangeable-lens digital camera 100 and example locations of thermometers (temperature sensors). FIG. 1A is a perspective view of the front surface side, and FIG. 1B is a perspective view of the back surface side.

A shutter button 61 can be operated with a half press and a full press. A control unit 50 described below recognizes a half press operation of the shutter button 61 as an image capture preparation instruction for a still image and a full press operation as an image capture start instruction for a still image.

A power switch 72 switches the power of the digital camera 100 on and off.

A display unit 28 is a liquid crystal display or an organic EL display including a touch panel 71 on a display screen. The display unit 28 is attached to the digital camera 100 via a hinge 29, and the orientation and angle of the display screen can be changed. The display unit 28 is illustrated in an open state in the diagram. The display unit 28 forms a part of the housing of the digital camera 100 when in a closed state.

The display unit 28 displays a settings screen (menu screen), captured images, information relating to the digital camera 100, and the like via control by the control unit 50.

A mode switch dial 60 switches the operation mode of the digital camera 100. The operation modes include a still image capturing mode, a moving image capturing mode, and a playback mode, for example. Note that the operation modes able to be switched to via the mode switch dial may be subdivided further into a plurality of operation modes. In this case, the final operation mode can be selected using another method such as via the menu screen.

An imaging unit 22 includes an image sensor and outputs a pixel signal group (analog image signal) representing an object image formed on the imaging surface. The image sensor, for example, may be a known CCD or CMOS color image sensor including a primary color Bayer array color filter. The image sensor includes a pixel array including a plurality of pixels in a two-dimensional array and a peripheral circuit for reading signals from the pixels. Each pixel accumulates a charge corresponding to the amount of incident light via photoelectric conversion. By reading a signal including voltage corresponding to the amount of charge accumulated in the exposure period from each pixel, the pixel signal group (analog image signal) representing the object image formed on the imaging surface is obtained. The imaging unit 22 generates a large amount of heat when operating and together with the control unit 50 described below is a heat source required by the digital camera 100.

In the present embodiment, the digital camera 100 includes a component (device) to be measured, a casing (housing), and a temperature sensor for estimating the ambient temperature. Temperature sensor is not particularly limited by type as long as it can be installed in a small electronic apparatus, and a chip thermistor may be used, for example.

The temperatures to be measured cannot be directly measured by temperature sensors provided in the digital camera 100. For example, for the measurement by a temperature sensor measuring the ambient temperature, the influence of the casing temperature cannot be removed. Also, the temperature sensor measuring the temperature of the device can only measure the temperature at or near the device and not the temperature of the actual device. Thus, the temperatures to be measured are estimated based on the measurements of the temperature sensors.

Hereinafter, a temperature sensor used for estimating the temperature of a component is referred to as a device thermometer, a temperature sensor used for estimating the temperature of the casing (housing) is referred to as a housing thermometer, and a temperature sensor used for estimating the ambient temperature is referred to as an ambient temperature thermometer.

The device thermometer (fourth temperature sensor) is arranged at or near the component to be monitored for temperature. In the present embodiment, a device thermometer (for the control unit) 94 that measures the temperature of the control unit 50 and a device thermometer (for the imaging unit) 95 that measures the temperature of the imaging unit 22 are provided. The device thermometer 94 is arranged at or near the control unit 50 on the substrate where the control unit 50 is mounted, for example. Also, the device thermometer 95 is arranged at or near the image sensor on the substrate where the image sensor is mounted.

The amount of heat generated by the imaging unit 22 and the control unit 50 tends to increase when the processing load is high and when the continuous operation time with the same processing load is long. For example, the amount of heat generated by the imaging unit 22 and the control unit 50 when capturing a moving image tends to increase when the shooting frame rate is high and when the continuous shooting time is long.

A housing thermometer 93 (third temperature sensor) is arranged at a location with correlation to the temperature of a position where the temperature reaches the highest from among locations that the user touches when operating the digital camera 100. In the present embodiment, the housing thermometer 93 is arranged at or near the surface of the grip upper portion.

A first ambient temperature thermometer 91 (first temperature sensor) and a second ambient temperature thermometer 92 (second temperature sensor) are arranged at positions with different levels of heat transferability of the heat generated by the imaging unit 22 and the control unit 50, which are components (heat sources) to be monitored for temperature. In this example, the first ambient temperature thermometer 91 and the second ambient temperature thermometer 92 are arranged at positions with difference distances from the heat source. Note that the first ambient temperature thermometer 91 and the second ambient temperature thermometer 92 may be arranged taking into account the thermal conductivity of the medium present in the transfer path of the heat from the heat source. In this example, the linear distance from the heat source to the first ambient temperature thermometer 91 is greater than the linear distance from the heat source to the second ambient temperature thermometer 92. In other words, the first ambient temperature thermometer 91 is arranged farther from the heat source than the second ambient temperature thermometer 92.

In the example illustrated in FIGS. 1A and 1B, the first ambient temperature thermometer 91 is arranged at the upper portion of the grip, and the second ambient temperature thermometer 92 is arranged at or near the inner surface of the back surface cover and the control unit 50. Also, as described below, the arrangement of the first ambient temperature thermometer 91 and the second ambient temperature thermometer 92 is determined such that a relationship between a change in temperature measured by the first ambient temperature thermometer 91 and a change in temperature measured by the second ambient temperature thermometer 92 satisfies a specific condition.

FIG. 2 is a block diagram illustrating a functional configuration example of the digital camera 100. Components described using FIGS. 1A and 1B are given the same reference numbers, and redundant descriptions are omitted.

A lens unit 150 is an interchangeable lens detachably attached to the digital camera 100. The lens unit 150 includes a diaphragm 151 and a drive circuit therefor, a lens group 152 and a drive circuit therefor, a lens control unit 153, and the like. The lens group 152 includes a movable lens such as a focus lens.

Power is supplied to the lens unit 150 from the digital camera 100 via a communication terminal 10. The control unit 50 controls the operations of the lens unit 150 by transmitting commands to the lens control unit 153 via the communication terminal 10 and adjusts the f-number and focusing distance.

A shutter 101 is a focal plane shutter that is opened and closed by the control of the control unit 50.

The control unit 50 is a processor (CPU, MPU, microprocessor, or the like) that can execute programs, for example. The control unit 50 loads a program stored in a non-volatile memory 56 into a memory 32 and executes the program to control the operation of the units of the digital camera 100 and implement the function of the digital camera 100. The control unit 50 communicates with the lens control unit 153 and controls the operation of the lens unit 150.

Also, the control unit 50 applies various image processing to the analog image signal read out from the imaging unit 22. The image processing applied by the control unit 50 may include, for example, preprocessing, color interpolation processing, correction processing, detection processing, data modification processing, evaluation value calculation processing, special effects processing, and the like.

The preprocessing may include A/D conversion, signal amplification, reference level adjustment, defective pixel correction, and the like.

The color interpolation processing is processing for interpolating values of color components not included in the pieces of pixel data forming the image data that is executed in a case where a color filter is provided in the image sensor. Color interpolation processing may be referred to as demosaic processing.

Correction processing may include various processing including white balance adjustment, tone correction, correction (image restoration) of image degradation caused by an optical aberration in the lens unit 150, correction of the effects of vignetting of the lens unit 150, color correction, and the like.

The detection processing may include processing for detecting a feature area (for example, a face area or a human body area) or movement thereof, processing for recognizing a person, and the like.

The data modification processing may include processing including trimming regions (trimming), combining, scaling, encoding and decoding, header information generation (data file generation), and the like. Generating image data for display and image data for recording may also be included in the data modification processing.

The evaluation value calculation processing may include processing including generating signals or evaluation values that are used in automatic focus detection (AF), generating evaluation values that are used in automatic exposure control (AE), and the like.

Special effects processing may include processing including adding a blur effect, changing color tone, relighting, and the like.

Note that these are examples of the processing that can be applied by the control unit 50, and are not intended to limit the processing applied by the control unit 50.

The non-volatile memory 56 is electrically rewritable and stores programs executable by the control unit 50, various types of setting values for the digital camera 100, GUI data, and the like. The memory 32 is RAM and may be used as the main memory of the control unit 50, buffer memory for image data, video memory for the display unit 28, or the like.

Detachable recording media 200 such as a memory card can be installed in a media slot 18. Note that the digital camera 100 may include a built-in storage apparatus.

The locations of the first ambient temperature thermometer 91 and the second ambient temperature thermometer 92 according to the present embodiment and a method of estimating the ambient temperature based on measurement values of thermometers will now be described.

Figure 3:
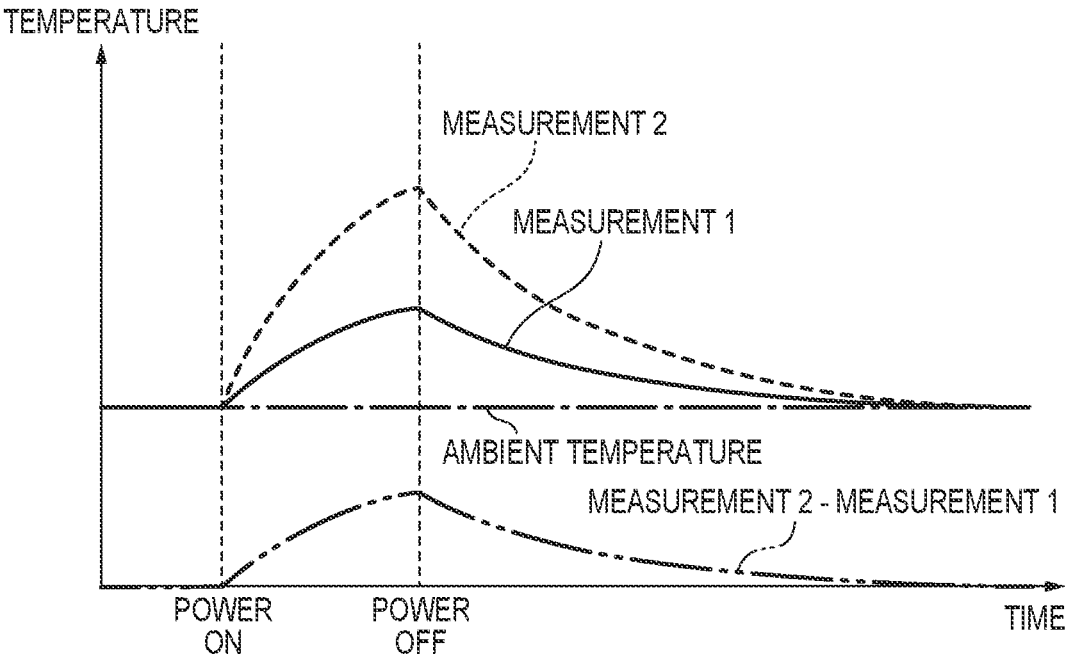
FIG. 3 is a diagram for describing a method of estimating the ambient temperature according to an embodiment.

FIG. 3 illustrates an example of the changes over time for the actual ambient temperature, a measurement (measurement 1) of the first ambient temperature thermometer 91, a measurement (measurement 2) of the second ambient temperature thermometer 92, and a difference (measurement 2–measurement 1) between the measurement 2 and the measurement 1 when the digital camera 100 is before operating, during operating, and after operating.

In this example, the actual ambient temperature (dot-dash line) is constant from before the digital camera 100 operates to after the digital camera 100 operates. Also, the measurement 1 (solid line) and the measurement 2 (broken line) are the same as the actual ambient temperature until the power is turned on.

When the power switch 72 is turned from off to on, the control unit 50 starts executing start up processing. When start up processing ends and the digital camera 100 enters standby mode, a moving image capture by the imaging unit 22, image data generation processing for a live view display by the control unit 50, and the like are started in order to display a live view display on the display unit 28. Accordingly, the temperature of the control unit 50 and the imaging unit 22 increase.

The distance between the second ambient temperature thermometer 92 and the heat sources (the control unit 50 and the imaging unit 22) is less than the distance between the heat sources and the first ambient temperature thermometer 91. Thus, the measurement 2 is higher than the measurement 1, and the difference between the measurement 2 and the measurement 1 increases over time.

When the power switch 72 is turned from on to off, the control unit 50 starts executing shut down processing. With the shut down processing, the imaging unit 22 and the control unit 50 stop operating and stop generating heat. Thus, the measurement 1 and the measurement 2 start to decrease due to the heat dissipating from the casing housing. Thereafter, the measurement 1 and the measurement 2 decrease until they are the same as the actual ambient temperature. When the power is turned OFF, the measurement 2 is higher than measurement 1. The measurement 2 and the measurement 1 decrease with the difference between the measurement 1 and the measurement 2 also decreasing over time.

As described above, in the present embodiment, the first ambient temperature thermometer 91 and the second ambient temperature thermometer 92 are arranged such that the change over time (indicated by the two-dot dash line in FIG. 3) of the difference (measurement 2–measurement 1) between the measurement 1 and the measurement 2 satisfies a specific condition. In particular, in the present embodiment, the first ambient temperature thermometer 91 and the second ambient temperature thermometer 92 are arranged such that the change over time of the difference between the measurement 1 and the measurement 2 from when the power is turned off after being turned on satisfies a specific condition.

An example of the specific condition includes the difference (measurement 2–measurement 1) between measurements and the difference (measurement 1 or measurement 2–ambient temperature) between one of the measurements and the ambient temperature being proportional. By arranging the first ambient temperature thermometer 91 and the second ambient temperature thermometer 92 such that the measurements satisfy such a condition, the ambient temperature can be easily estimated from the first measurement and the second measurement. For example, in a case where the specific condition is the difference between measurements and the difference between the measurement 1 and the ambient temperature being proportional, the ambient temperature can be estimated from the first measurement and the second measurement as follows. Note that the ambient temperature in this example is not a measurement of a thermometer provided in the digital camera 100 but a measurement (true value) of a thermometer arranged at or near the digital camera 100.

$$\text{Ambient temperature} =$$
$$\text{measurement } 1 - \alpha(\text{measurement } 2 - \text{measurement } 1)$$
$$\alpha = \text{coefficient}$$

The coefficient $\alpha$ can be decided by actually measuring the change in the measurement 1 and the measurement 2 after the power is turned off, for example. In the present embodiment, the first ambient temperature thermometer 91 and the second ambient temperature thermometer 92 are arranged such that the difference between the measurement 1 and the measurement 2 after the power is turned off and the difference between one of the measurements and the ambient temperature change in the same manner. Thus, the coefficient $\alpha$ is set to 1.

In this manner, the ambient temperature can be estimated without using a plurality of transfer functions for each heat source, allowing for the estimation processing to be simplified by not requiring the transfer functions to be prepared. This is also advantageous in that the estimation processing is not dependent on the number of heat sources.

The specific arrangement of the first ambient temperature thermometer 91 and the second ambient temperature thermometer 92 can be decided as appropriate depending on the position of the heat sources included in the electronic apparatus, the positions where temperature sensors can be mounted, and the like. For example, first, the position of the second ambient temperature thermometer 92 is set close to the heat source, and then a position satisfying the condition can be set as the position for the first ambient temperature thermometer 91. Note that the temperature sensor does not need to be mounted at an ideal position, and a member for adjusting the transfer of heat can be provided in the area around the first ambient temperature thermometer 91 and/or the second ambient temperature thermometer 92, on a mounting surface thereof, or the like such that the specific condition described above is satisfied. The member for adjusting the transfer of heat may be a member (heat insulation material) with low thermal conductivity, a member with high thermal conductivity, a heat absorbing member, a heat reflecting member, or the like.

The control unit 50 can execute estimation of the ambient temperature based on the measurement 1 and the measurement 2 at any timing and can execute processing using the estimated ambient temperature. However, in particular, the control unit 50 can use the ambient temperature estimation result in determining whether or not to restrict the function of the digital camera 100.

FIGS. 4A and 4B are flowcharts relating to the operation of the control unit 50 that executes function restriction of the digital camera 100 based on the estimated ambient temperature. Here, the operations executed when the digital camera 100 is started up (when the power switch is turned on) will be described. Note that in FIGS. 4A and 4B, operations of the control unit 50 that are not directly related to processing for estimating the ambient temperature and processing using the estimated ambient temperature, such as automatic focus detection, automatic exposure control, capturing images for recording, and the like, are not described.

In step S500, the control unit 50 reads out the most recently stored estimated ambient temperature from the non-volatile memory 56. In a case where there is no estimated ambient temperature stored in the non-volatile memory 56, the control unit 50 reads out a predetermined initial value. The initial value is 23° C., for example, but may be any value.

In step S501, the control unit 50 obtains a measurement from the first ambient temperature thermometer 91 and stores it in the memory 32 as the measurement 1. Also, the control unit 50 obtains a measurement from the second ambient temperature thermometer 92 and stores it in the memory 32 as the measurement 2.

In step S502, the control unit 50 obtains an estimated ambient temperature using the measurement 1, the measurement 2, and the predetermined coefficient $\alpha$ as follows.

$$\text{Estimated ambient temperature} = \text{measurement } 1 - \alpha$$
$$(\text{measurement } 2 - \text{measurement } 1)$$

where $\alpha$ is a coefficient.

Then, the control unit 50 stores the estimated ambient temperature in the memory 32.

In step S503, the control unit 50 stores the temperature obtained by adding a constant H to the estimated ambient temperature obtained in step S502 in the memory 32 as a housing restriction temperature. The constant H is 20° C., for example, but may be any value.

In step S504, the control unit 50 starts standby time operations of the digital camera 100. Specifically, the control unit 50 controls the imaging unit 22 to capture a moving image at a predetermined frame rate. The control unit 50 continuously executes generation of image data for live view display based on frame images read out from the imaging unit 22 and display of the image data for live view display on the display unit 28.

The control unit 50 executes processing relating to automatic exposure control and automatic focus detection in parallel with live view display operations to adjust an exposure of the moving image captured by the imaging unit 22 and a focusing distance of the lens unit 150. Also, the control unit 50 monitors the interactions with the input devices such as the shutter button 61 and executes processing according to the detected interaction. For example, in a case where an interaction with the shutter button 61 is detected, the control unit 50 executes still image capturing preparation operations, still image capturing, and recording operations. Also, in a case where an interaction with a moving image recording button is detected, the control unit 50 starts or stops generation of the moving image data for recording and execution of recording processing.

Until the power switch 72 being turned to off is detected, operations including live view display, capture and recording of still images, capture and recording of a moving image, playback of moving image data or still image data from the recording media 200, and the like are executed. The temperature of the digital camera 100 increases due to continuous operation of the imaging unit 22 and the control unit 50, which are the main heat sources, and due to an increase in the processing load.

In step S505, the control unit 50 obtains a measurement from the housing thermometer 93 and stores it as the housing temperature in the memory 32.

In step S506, the control unit 50 compares the housing restriction temperature (threshold) obtained in step S503 and the housing temperature obtained in step S505. When the control unit 50 determines that the housing temperature is higher than the housing restriction temperature, step S512 is executed. When the control unit 50 determines that the housing temperature is determined to not be higher than the housing restriction temperature, step S507 is executed.

In step S507, the control unit 50 obtains a measurement from the device thermometer 94 and stores it in the memory 32 as the temperature of the control unit 50. Also, the control unit 50 obtains a measurement from the device thermometer 95 and stores it in the memory 32 as the temperature of the imaging unit 22.

In step S508, the control unit 50 compares the control unit temperature obtained in step S507 and the predetermined device restriction temperature for the control unit 50. The device restriction temperature for the control unit 50 is 70° C., for example, but may be any value. When the control unit 50 determines that the temperature of the control unit 50 is higher than the device restriction temperature for the control unit 50, step S512 is executed.

Also, the control unit 50 compares the temperature of the imaging unit 22 obtained in step S507 and the predetermined device restriction temperature for the imaging unit 22. The device restriction temperature for the imaging unit 22 is a constant and is 80° C., for example, but may be any value. When the control unit 50 determines that the temperature of the imaging unit 22 is higher than the device restriction temperature for the imaging unit 22, step S512 is executed. Also, when the control unit 50 determines that the temperature of the imaging unit 22 is not higher than the device restriction temperature for the imaging unit 22, step S509 is executed.

In this manner, when the temperature of the control unit 50 is higher than the device restriction temperature for the control unit 50 or the temperature of the imaging unit 22 is higher than the device restriction temperature for the imaging unit 22, the control unit 50 transitions to step S512.

In the present embodiment, the component (device) to be monitored for temperature correspond to the control unit 50 and the imaging unit 22. However, the component to be monitored for temperature may be something else. In step S508, the control unit 50 compares the measurement of the temperature and the restriction temperature for each component to be monitored for temperature and executes step S512 if even one of the components has a measurement that exceeds the restriction temperature.

In step S509, the control unit 50 determines whether or not the power switch 72 has been turned off. When the control unit 50 determines that the power switch 72 has been turned off, step S510 is executed, and when the control unit 50 determines that the power switch 72 has not been turned off, step S505 is executed.

In step S510, the control unit 50 stores the estimated ambient temperature obtained in step S503 in the non-volatile memory 56.

In step S511, the control unit 50 executes shut down processing for the digital camera 100. Specifically, the control unit 50 stops the operations of the imaging unit 22 and the display unit 28 and cuts off the supply of power to the units of the digital camera 100.

As in step S510, in step S512, the control unit 50 stores the estimated ambient temperature obtained in step S503 in the non-volatile memory 56.

In step S513, the control unit 50 executes shut down processing for the digital camera 100 as an example of function restriction of the digital camera 100. Specifically, the control unit 50 stops the operations of the imaging unit 22 and the display unit 28 and cuts off the supply of power to the units of the digital camera 100. Before starting the shut down processing, the control unit 50 may display a message notifying the user of shut down due to temperature restriction on the display unit 28 for a certain amount of time.

Note that instead of executing the shut down processing, the power supply to the unit/s involved with processing using the component with a measurement exceeding the restriction temperature may be cut off or the processing load may be reduced until the measurement is equal to or less than the restriction temperature. The control unit 50, for example, can reduce the frame rate for capturing a moving image, can reduce the resolution of the image data for display, and can reduce the display luminance of the display unit 28.

As described above, in the present embodiment, the thermometers (temperature sensors) are arranged such that the difference in the measurements satisfy a specific condition. This allows the ambient temperature to be estimated accurately via a simple method. Accordingly, the housing temperature can be appropriately managed, and the safety of the housing temperature can be guaranteed. Also, by improving the estimation accuracy of the ambient temperature, the margin for error can be reduced. As a result, the continuously operable time (for example, moving image capture time or the like) can be increased.

Second Embodiment

Next, the second embodiment of the present invention will be described. The present embodiment is different from the first embodiment in terms of the method of obtaining the estimated ambient temperature executed in step S502 in FIG. 4A. Accordingly, only the method of obtaining the estimated ambient temperature according to the present embodiment will be described below.

FIG. 5 is a flowchart relating to the calculation operation for the estimated ambient temperature according to the present embodiment.

In step S701, the control unit 50 obtains the difference between the measurement 1 and the measurement 2 and stores it as ΔT in the memory 32.

In step S702, the control unit 50 compares the absolute value of ΔT obtained in step S701 and a predetermined constant. The constant is 1° C., for example, but may be any value. When the control unit 50 determines that the absolute value of ΔT is less than the constant, step S703 is executed. Otherwise, step S704 is executed. Step S702 corresponds to determining whether or not the difference between the measurement 1 and the measurement 2 is small.

In step S703, the control unit 50 stores the measurement 1 as the estimated ambient temperature in the memory 32 instead of estimating the ambient temperature using the measurement 1 and the measurement 2.

As in step S502, in step S704, the control unit 50 obtains the estimated ambient temperature using the measurement 1 and the measurement 2 and stores it in the memory 32.

In this manner, in the present embodiment, in a case where the difference between the measurement 2 and the measurement 1 is less than a predetermined threshold, the measurement of the ambient temperature thermometer farther from the heat source in terms of distance is taken as the estimated ambient temperature. This is because when the difference between the measurement 2 and the measurement 1 is small, it is thought that the accuracy of the estimated ambient temperature obtained using the formula described above is low. According to the present embodiment, in addition to the effect of the first embodiment, the estimation accuracy of the ambient temperature can be improved when the difference between the measurement 2 and the measurement 1 is small.

Third Embodiment

Next, a third embodiment of the present invention will be described. As in the second embodiment, the present embodiment is also different from the first embodiment in terms of the method of obtaining the estimated ambient temperature executed in step S502 in FIG. 4A. Accordingly, only the method of obtaining the estimated ambient temperature according to the present embodiment will be described below.

FIG. 6 is a flowchart relating to the calculation operation for the estimated ambient temperature according to the present embodiment.

In step S801, the control unit 50 obtains the difference between the measurement 1 and the measurement 2 and stores it as ΔT in the memory 32.

In step S802, the control unit 50 compares the absolute value of ΔT obtained in step S801 and a predetermined constant. The constant is 4° C., for example, but may be any value. When the control unit 50 determines that the absolute value of ΔT is greater than the constant, step S803 is executed. Otherwise, step S804 is executed. Step S802 corresponds to determining whether or not the difference between the measurement 1 and the measurement 2 is large.

In step S803, the control unit 50 stores the most recent stored estimated ambient temperature read out from the non-volatile memory 56 in step S500 in the memory 32, instead of estimating the ambient temperature using the measurement 1 and the measurement 2.

As in step S502, in step S804, the control unit 50 obtains the estimated ambient temperature using the measurement 1 and the measurement 2 and stores it in the memory 32.

In this manner, in the present embodiment, in a case where the difference between the measurement 2 and the measurement 1 exceeds a predetermined threshold, the most recently obtained estimated ambient temperature can be used. This is because when the difference between the measurement 2 and the measurement 1 is large, it is thought that the accuracy of the estimated ambient temperature obtained using the formula described above is low. According to the present embodiment, in addition to the effect of the first embodiment, the estimation accuracy of the ambient temperature can be improved when the difference between the measurement 2 and the measurement 1 is large.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-203530, filed Dec. 20, 2022, which is hereby incorporated by reference herein in its entirety.

What is claimed is:

1. An electronic apparatus comprising:
a first thermometer;
a second thermometer,
wherein the first thermometer and the second thermometer are arranged such that a change over time of a difference between a first measurement obtained by the first thermometer and a second measurement obtained by the second thermometer satisfies a specific condition;
a CPU;
a memory that stores a program for, when the program is executed by the CPU, causing the electronic apparatus to function as:

a control unit that executes control for restricting a function of the electronic apparatus in response to a temperature of a housing of the electronic apparatus exceeding a threshold, wherein the control unit estimates an ambient temperature based on the first measurement, the second measurement, and the specific condition and sets the threshold based on the estimated ambient temperature, and wherein the control unit sets a second value obtained by adding a predetermined value to the estimated ambient temperature as the threshold.

2. The electronic apparatus according to claim 1, further comprising:

a third thermometer provided at or near a surface of the housing of the electronic apparatus, wherein the control unit executes the control for the restricting in response to a third measurement obtained by the third thermometer exceeding the threshold.

3. The electronic apparatus according to claim 1, wherein the first thermometer and the second thermometer are arranged such that the second measurement is greater than the first measurement.

4. The electronic apparatus according to claim 1, wherein the change over time is a change over time of a difference between the first measurement and the second measurement from a point in time when power of the electronic apparatus is switched from on to off.

5. The electronic apparatus according to claim 1, wherein the specific condition is (i) a difference between the first measurement and the second measurement and (ii) a difference between an ambient temperature and the first measurement being proportional.

6. The electronic apparatus according to claim 5, wherein the control unit obtains the estimated ambient temperature by subtracting a first value from one of the first measurement or the second measurement, the first value being obtained by multiplying a difference between the first measurement and the second measurement by a predetermined coefficient.

7. The electronic apparatus according to claim 1, wherein in a case where a difference between the first measurement and the second measurement is less than a predetermined first constant, the control unit sets the threshold using the first measurement as the estimated ambient temperature.

8. The electronic apparatus according to claim 1, wherein in a case where a difference between the first measurement and the second measurement is greater than a predetermined second constant, the control unit sets the threshold using a most recently estimated ambient temperature as the estimated ambient temperature.

9. The electronic apparatus according to claim 1, further comprising:

a component that is a heat source;

a fourth thermometer provided at or near the component, wherein the control unit executes second control for restricting a function of the electronic apparatus in response to a fourth measurement obtained by the fourth thermometer exceeding a second threshold.

10. The electronic apparatus according to claim 1, wherein the control unit stores information of the estimated ambient temperature in the memory in response to a power off instruction.

11. The electronic apparatus according to claim 1, further comprising:

a fifth thermometer for the CPU;

wherein the control unit executes control for restricting a function of the electronic apparatus in response to a fifth measurement obtained by the fifth thermometer exceeding a third threshold.

12. The electronic apparatus according to claim 1, wherein the electronic apparatus is a portable apparatus.

13. A method of controlling an electronic apparatus, wherein the electronic apparatus comprises:

a first thermometer; and a second thermometer;

wherein the first thermometer and the second thermometer are arranged such that a change over time of a difference between a first measurement obtained by the first thermometer and a second measurement obtained by the second thermometer satisfies a specific condition;

the method comprising:

executing control for restricting a function of the electronic apparatus in response to a temperature of a housing of the electronic apparatus exceeding a threshold, wherein the executing control includes estimating an ambient temperature based on the first measurement, the second measurement, and the specific condition, setting the threshold based on the estimated ambient temperature, wherein the setting sets a second value obtained by adding a predetermined value to the estimated ambient temperature as the threshold.

14. The electronic apparatus according to claim 9, wherein the component Of the heat source is an image sensor.

* * * * *